T. SPENCER.
MOLD FOR STORAGE BATTERY GRIDS AND METHOD OF MAKING THE SAME.
APPLICATION FILED FEB. 26, 1914.
1,238,211.
Patented Aug. 28, 1917.
3 SHEETS—SHEET 1.
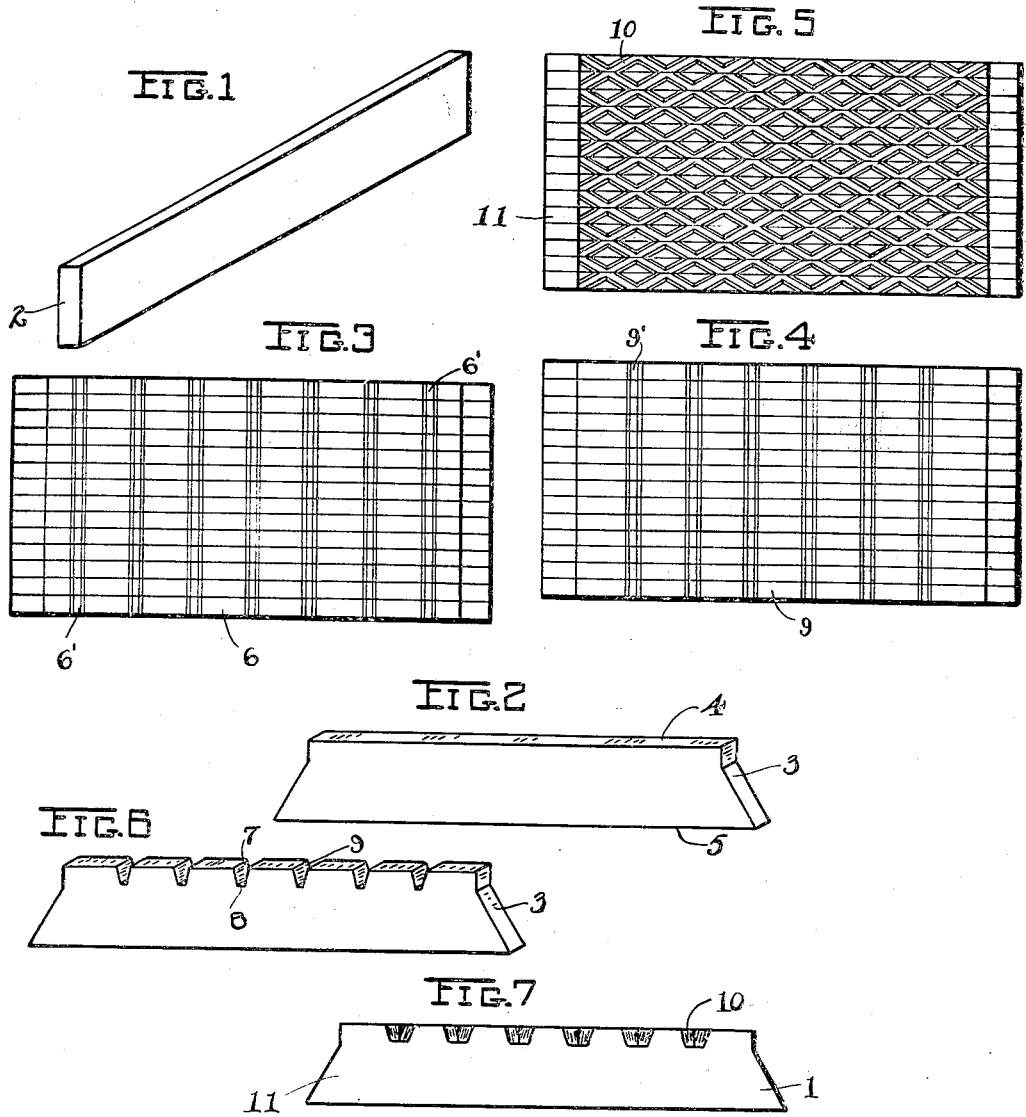
WITNESSES:
INVENTOR
THOMAS SPENCER
BY Ira J Adams
ATTORNEY T. SPENCER.
MOLD FOR STORAGE BATTERY GRIDS AND METHOD OF MAKING THE SAME.
APPLICATION FILED FEB. 26, 1914.
1,238,211.
Patented Aug. 28, 1917.
3 SHEETS—SHEET 2.
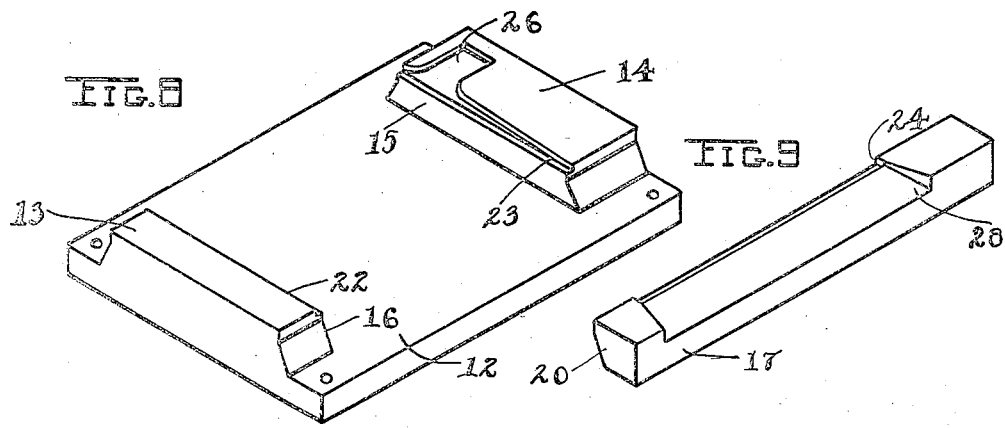
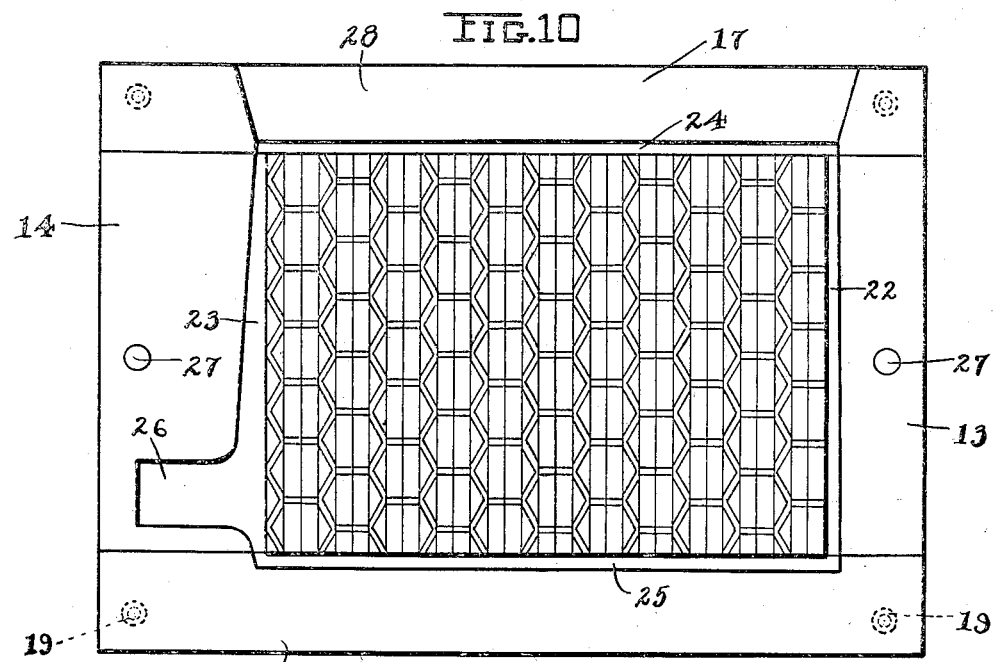
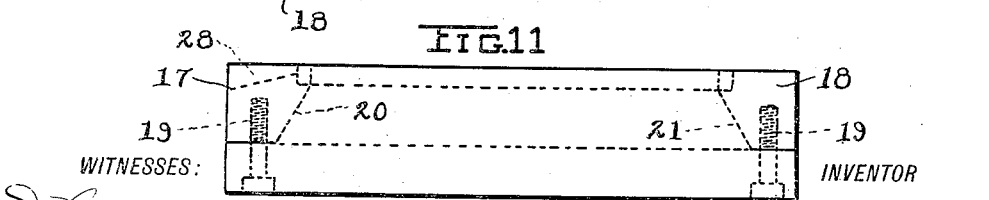
WITNESSES:
D. Brewer
H. G. Grover
INVENTOR
THOMAS SPENCER
BY Ira J. Adams
ATTORNEY T. SPENCER.
MOLD FOR STORAGE BATTERY GRIDS AND METHOD OF MAKING THE SAME.
APPLICATION FILED FEB. 26, 1914.
1,238,211.
Patented Aug. 28, 1917.
3 SHEETS—SHEET 3.
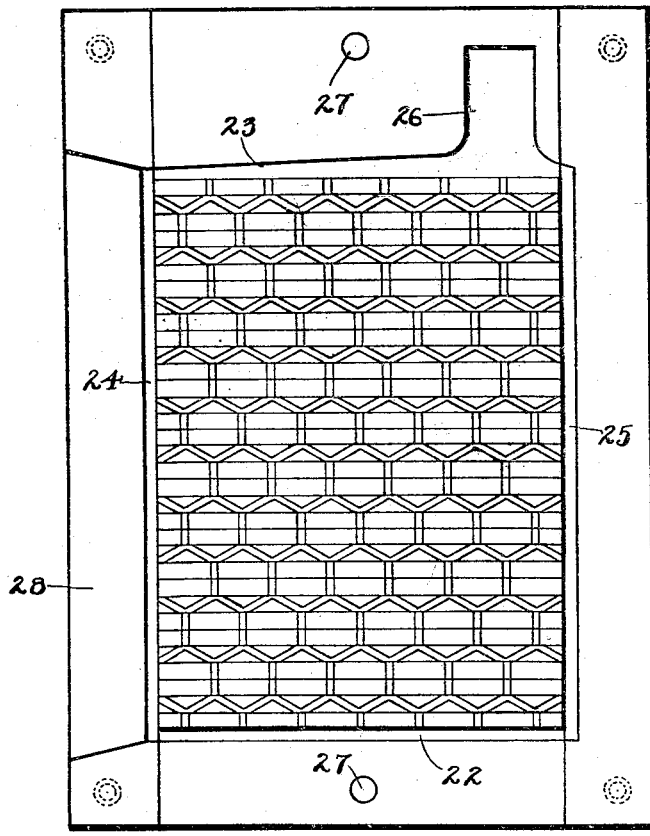
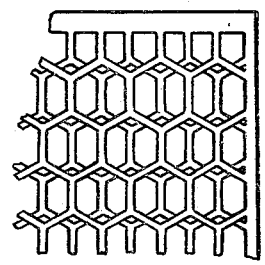
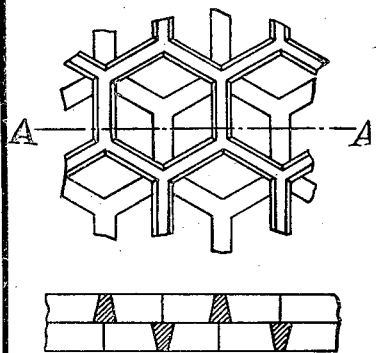
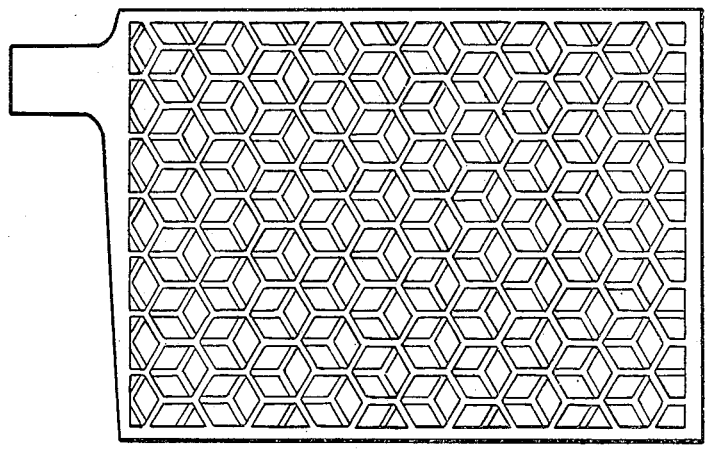
WITNESSES:
D. Brewer
H. G. Grover
INVENTOR
THOMAS SPENCER
BY Ira J. Adams
ATTORNEY

UNITED STATES PATENT OFFICE.

THOMAS SPENCER, OF PHILADELPHIA, PENNSYLVANIA, ASSIGNOR, BY MESNE ASSIGNMENTS, TO NATIONAL CARBON COMPANY, INC., A CORPORATION OF NEW YORK.

MOLD FOR STORAGE-BATTERY GRIDS AND METHOD OF MAKING THE SAME.

1,238,211. Specification of Letters Patent. Patented Aug. 28, 1917.

Application filed February 26, 1914. Serial No. 821,144.

*To all whom it may concern:*

Be it known that I, THOMAS SPENCER, a citizen of the United States, residing at Philadelphia, in the county of Philadelphia and State of Pennsylvania, have invented a certain new and useful Improvement in Molds for Storage-Battery Grids and Methods of Making the Same, of which the following is a full, clear, and exact description.

This invention relates to molds for storage battery grids and method of making the molds. It is highly desirable that a storage battery grid be made of a net work of metal having a large number of meshes which furnish paths for the current to all parts of the grid, and also retain the oxid or other material securely therein. My improved grid is composed of an intricate metallic net work having a small amount of metal around a large amount of paste, and if a mold for casting the same were made by cutting the configurations directly therein, it would be a very laborious and expensive process. I have devised a novel method, that differs radically from prior methods, whereby a mold may be made not only for my improved grid but also for other grids. The details of the grid and mold for the same are set forth in the appended description and illustrated in the annexed drawings in which:

Figure 1 shows a perspective view of a single element or strip of the mold before being machined.

Fig. 2 shows in perspective the manner in which the ends of each strip are formed.

Fig. 3 shows a top view of a number of strips of one type stacked and grooved.

Fig. 4 shows a top view of a number of stacked strips grooved differently from those of Fig. 3.

Fig. 5 shows a top view of a number of stacked elements of the mold also grooved differently from those of either Figs. 3 or 4.

Fig. 6 is a perspective view of one of the grooved elements of Fig. 4.

Fig. 7 is a front view of the lower element of Fig. 5.

Fig. 8 is an isometric view of one member of the frame for holding the individual grooved elements.

Fig. 9 is an isometric view of one of the side members of the mold frame.

Fig. 10 is a top view of the lower half of the mold with the elements properly assembled.

Fig. 11 is the end view of Fig. 10.

Fig. 12 is the bottom view of the upper half of the mold.

Fig. 13 is the plan view of the grid formed from the mold.

Fig. 14 is an enlarged plan view of a portion of the grid.

Fig. 15 is a cross section on the line A—A of the portion of the grid shown in Fig. 14.

Fig. 16 is the modified form of a grid which may be made by the improved process.

According to this invention one-half of the mold for making a storage battery grid, instead of being made of a solid piece of metal, consists of a large number of small strips 1 as shown in Fig. 1. In this specific case each of the pieces 1 is of equal thickness, length and width, though the dimensions may of course be varied. The ends 2 of the strips have the form 3 shown in Fig. 2 so that the top 4 is somewhat narrower than the base 5.

The strips or elements 6 are divided into three stacks of substantially the same number of pieces and grooved in a suitable machine, in the manner shown in Figs. 3, 4, 5. In order to form a hexagonal grid, which is the specific form herein illustrated, the group of elements 6 shown in Fig. 3 has a number of equidistant grooves 6' cut therein. The grooves are made slightly wider at the top 7 than at the base 8 (Figs. 6 and 7) to provide the necessary draft for removing the grid. In this figure, the distance between the edges 3 and the end grooves is one-half the distance between the individual grooves.

The members shown in Figs. 4 and 6 are made in exactly the same manner as in Fig. 3 and have the grooves spaced the same distance apart as the grooves 6'. The end grooves of the members 9, however, are a full space from the end 3 so that the grooves 9' are staggered in relation to the grooves 6'.

In Figs. 5 and 7, two series of parallel grooves 10 are cut on an angle of 30 and 120 degrees respectively with the longitudinal edge of the blocks 1. The horizontal distance between these diagonal grooves is the same distance as that between the grooves 6' and 9' and the grooves are adapted to unite with either grooves 6' or 9', when the strips are suitably arranged.

The form which supports the individual members 6, 9 and 11 consists of a base plate 12 having upwardly projecting members 13 and 14 at its ends, both of which may be integral therewith. The cross sectional shape of these end members is the same as the individual pieces shown in Fig. 2, but the thickness is greater. The distance between the two inner faces 15 and 16 of the members 13 and 14 respectively is the same as the combined thickness of the individual strips composing the mold.

To form the lower half of the mold shown in Fig. 10, a plurality of members 6, 9 and 11 are mounted between the end pieces 13 and 14. It will be noted that to do this, starting from the end 13, two of the blocks 9, one of 11, two of 6 and one of 11, will be used. This will then be repeated until the space between 13 and 14 is completely filled.

To hold these elements or strips in place, the side pieces 17 and 18 will be attached to the base 12 by means of screws 19 (Figs. 10 and 11). The inner faces 20 and 21 of these members are shaped to correspond with the angle of the ends 3 of the strips which rigidly clamp them in the proper position. To provide an edge for the grid, channels 22, 23, 24 and 25 are formed in the members 13, 14, 17 and 18 respectively which completely surround the built up structure. The passage 26 in the member 14 in Figs. 8 and 10 forms the mold for the terminal. For alining the two halves of the mold, holes 27 may be formed in each end of the frame for inserting dowel pins. The gate for pouring in the molten metal consists of a channel 28 (Figs. 9, 10 and 11) cut across the face of the sides 17 and extending the entire length of the structure.

The upper half of the mold shown in Fig. 12 is built up in the same manner as the bottom from strips 6, 9 and 11. It differs only in having the strips 6, 9 and 11 combined in such a way that the individual hexagons are staggered in relation to those of the bottom half. This is done by using one strip of 6, one of 11, two of 9, one of 11 (reversed), two of 6, etc. The upper frame in which the strips are built differs from the lower frame only in having the depression 26 as well as the gate 28 reversely arranged so that they will superpose with those of the latter when the two molds are placed together.

Figs. 14 and 15 show the manner in which the hexagons, respectively cast in the upper and lower portions of the mold, reinforce each other. These figures also show the draft of the ribs. To avoid confusion the draft has not been shown in Figs. 10, 12 and 13. In Figs. 10 and 12 it will be noticed that absolutely perfect hexagons are not formed by this method because the horizontal width of the vertical grooves is less than the corresponding width of the angular grooves. The corners, which are quite small, may be readily chipped out to form the perfect hexagonal grid as shown in Figs. 13 and 14.

Instead of staggering the hexagons as previously described they may be placed in other relations for instance as shown in Fig. 16. In both arrangements it will be noticed that the two halves of the grid will combine in such a way as to reinforce each other and render the grid more rigid. The spacing of the ribs of each half of the grid, back of the interstices of the other will furthermore aid in holding the active material therein and support it better than if the ribs are in alinement.

Considerable difficulty would be encountered in making a mold of this form from integral pieces of metal. By the use of small machined strips, however, this and other complex molds may easily be built up, as all the strips are interchangeable. Furthermore it will be possible to replace worn or damaged portions and thus obviate the necessity of renewing the entire mold.

Instead of using the two strips as shown in Fig. 3 to form the vertical sides of the hexagon one strip of double thickness can be used. It is, of course, obvious that three or more strips 6 could be used to make a sort of oblong hexagon if desired.

It will be apparent that molds may be made up for other forms of grids than the ones specifically referred to herein.

Having described my invention, what I claim is:

1. A mold for storage battery electrodes consisting of a plurality of adjoining parallel strips, the upper surfaces of adjoining strips being grooved in different directions to intersect and form a plurality of closed figures on the upper surface of the combined strips.

2. A mold for storage battery electrodes consisting of a plurality of adjoining parallel strips, the upper surfaces of adjoining strips being grooved in different directions to intersect and form a plurality of closed figures on the upper surface of the combined strips, and means adapted to hold the strips together.

3. A mold for storage battery electrodes consisting of a plurality of adjoining parallel strips of similar form, the upper surfaces of adjoining strips being grooved in different directions to intersect and form a plurality of closed figures on the upper surface of the combined strips, a support for said strips and means adapted to secure the strips to the support.

4. A mold for storage battery electrodes consisting of a support, a plurality of adjoining parallel strips having their ends of similar form and the upper surfaces of adjoining strips being grooved in different directions to form a plurality of closed figures on the upper surface of the combined strips, a frame adapted to engage the ends of the strips and means for attaching the frame to the support.

5. A mold for storage battery electrodes consisting of a support having projecting end members, a plurality of adjoining parallel strips of similar form placed between said end members, the upper surfaces of adjoining strips being grooved in different directions to intersect and form a plurality of closed figures on the upper surface of the combined strips, and a side member adapted to be attached to said support to secure the strips thereto.

6. A mold for storage battery electrodes consisting of a support having projecting end members, one of said end members having a channel adapted to form a projecting lug, a plurality of adjoining parallel strips of similar form between said ends, the upper surfaces of adjoining strips being grooved in different directions to intersect and form a plurality of closed figures on the upper surface of the combined strips, and side members adapted to be attached to said support to secure the strips thereto.

7. A separable mold for storage battery electrodes, consisting of two similarly formed members adapted to be placed together, each consisting of a support, a plurality of adjoining parallel strips grooved in different directions to intersect to form a plurality of closed figures on the upper surface of the combined strips, means for clamping the combined strips to the support and a gate for admitting molten metal to the hollow intermediate space.

8. A mold for storage battery electrodes consisting of a plurality of adjoining parallel strips of similar form having spaced grooves in the corresponding faces, said strips consisting of a set diagonally grooved in two directions, a set perpendicularly grooved adapted to join the said diagonal grooves when placed alongside the strips of the first mentioned set, a third set having differently spaced perpendicular grooves also adapted to join the diagonal grooves in the strips of said first mentioned set when placed alongside, whereby the various grooved strips may be repeated in such a manner as to form suitable figures and means adapted to hold the strips together.

9. A mold for storage battery electrodes consisting of a plurality of adjoining parallel strips, one strip being diagonally grooved in two directions, a second strip on one side of the first mentioned strip having perpendicular grooves joining the diagonal grooves thereof, a third strip on the other side of the first mentioned strip having differently spaced perpendicular grooves joining the diagonal grooves thereof, and a fourth strip on the other side of the third strip having diagonal grooves joining with the grooves of the said third strip.

10. A method of making a storage battery mold which consists in assembling a plurality of strips of similar form into three groups, cutting a plurality of spaced diagonal channels in the face of one group, cutting a plurality of perpendicular grooves in the second group, cutting a plurality of perpendicular grooves in the third group but in staggered relation to those of the second group, and re-assembling the strips to form a mold of the desired configuration.

11. A method of building up a storage battery mold, which consists in cutting in the face of a plurality of strips two sets of equidistant grooves inclined in opposite directions, cutting in the face of another plurality of strips perpendicular grooves spaced apart the same longitudinal distance as the grooves of the first mentioned strips and placing one strip with inclined grooves and another with perpendicular grooves alternately in said frame with grooves of adjacent strips joining together.

12. A method of building up a storage battery mold, which consists in assembling a plurality of strips of similar form into three groups, cutting in one group two sets of grooves inclined in opposite directions, cutting perpendicular grooves in the second group, cutting perpendicular grooves in the third group staggered in relation to the grooves of the second group, and placing in a supporting frame strips taken from each group in regular succession.

In testimony whereof, I hereunto affix my signature.

THOMAS SPENCER.

Witnesses:
C. W. GULDEN,
RUD H. KLAUDER.